Nov. 11, 1969  K. P. MORRITT  3,477,659
ROTATABLE SPOOL FISHING REEL
Filed March 25, 1966 4 Sheets-Sheet 1
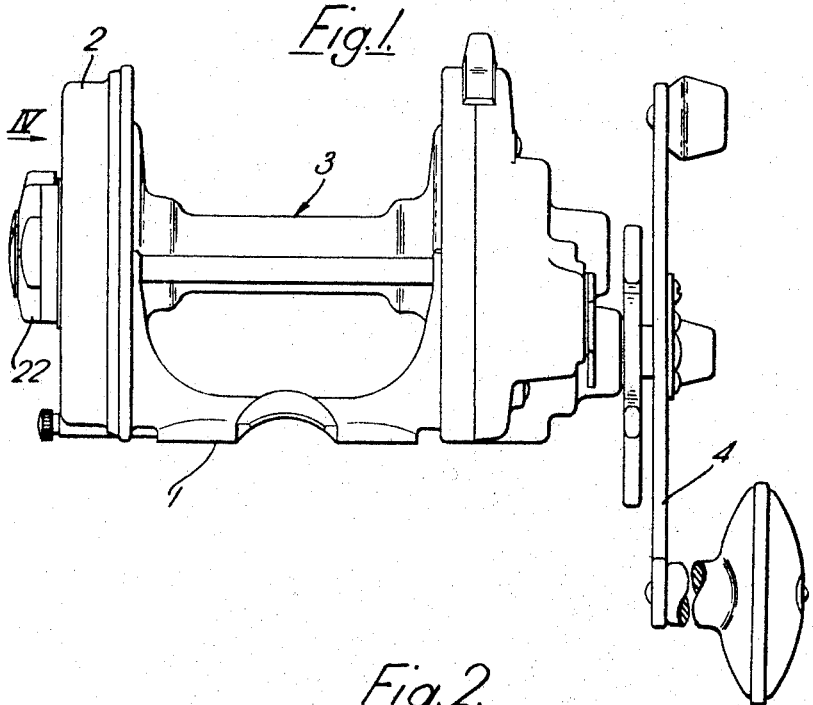
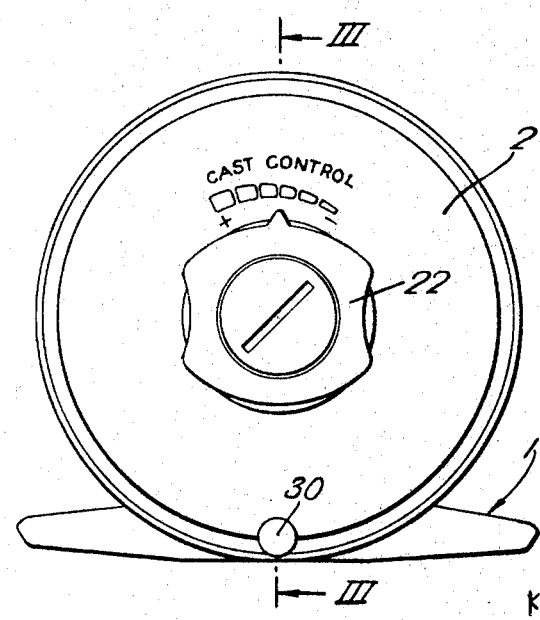
Inventor
KENNETH PATRICK MORRITT
By Jacobs+Jacobs
Attorney Nov. 11, 1969   K. P. MORRITT   3,477,659
ROTATABLE SPOOL FISHING REEL
Filed March 25, 1966   4 Sheets-Sheet 2
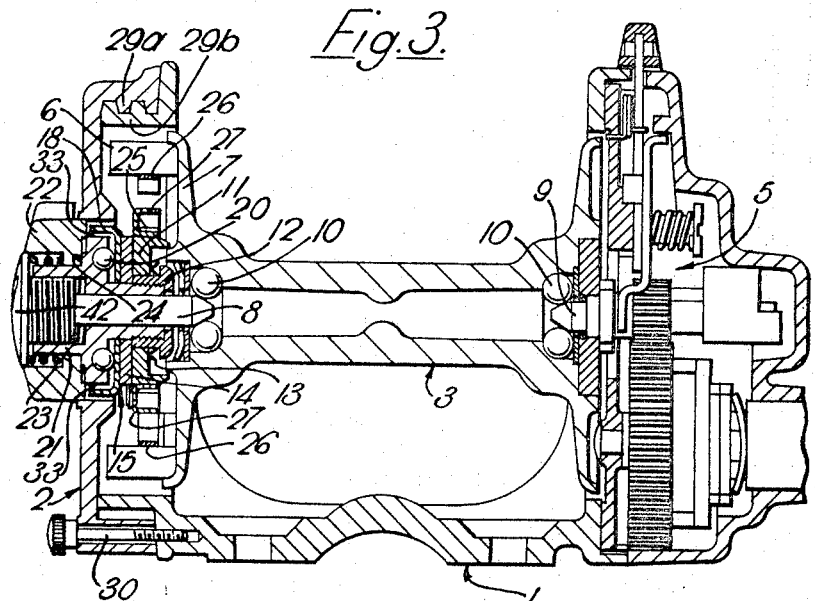
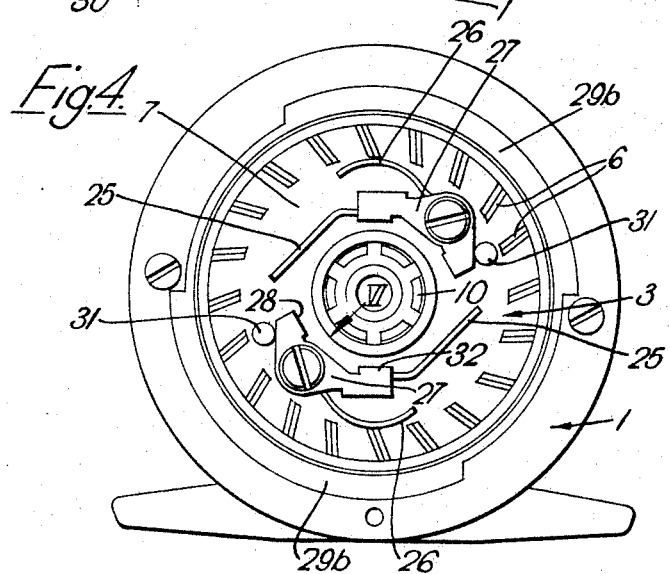
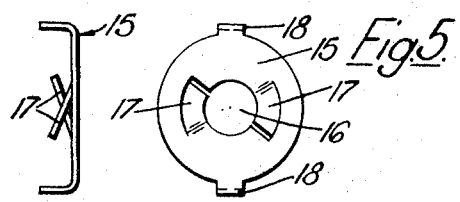
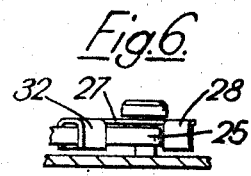
Inventor
KENNETH PATRICK MORRITT
By
Attorney

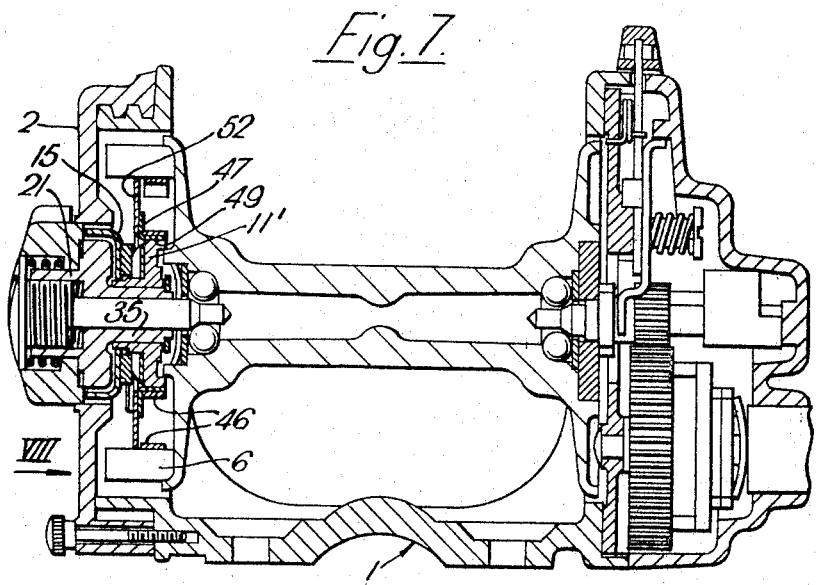
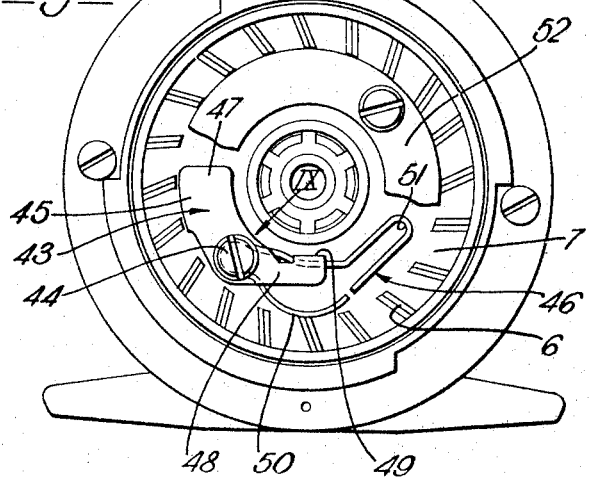
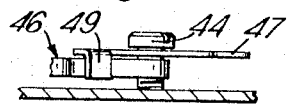

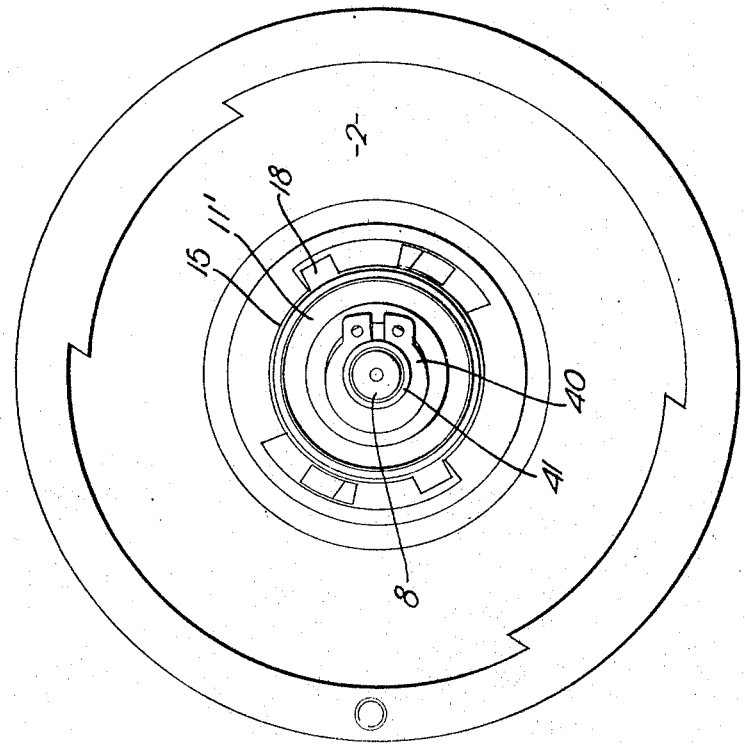
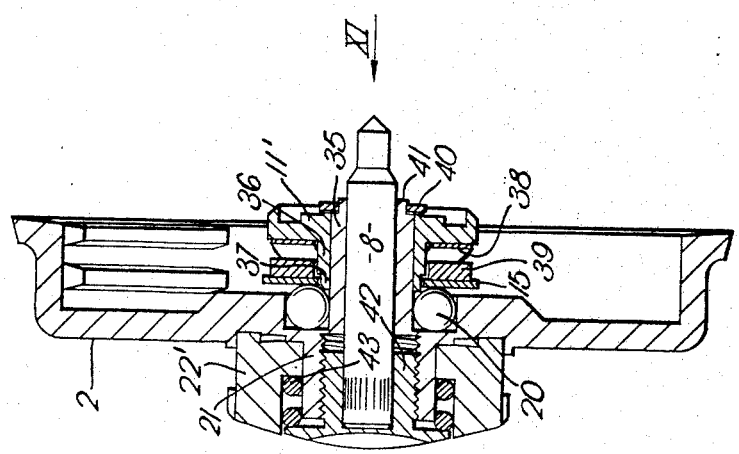

United States Patent Office 3,477,659
Patented Nov. 11, 1969

3,477,659
ROTATABLE SPOOL FISHING REEL
Kenneth Patrick Morritt, Cheam, England, assignor to K. P. Morritt Limited, Falmouth, Cornwall, England
Filed Mar. 25, 1966, Ser. No. 537,533
Claims priority, application Great Britain, Apr. 28, 1965, 17,841/65; Aug. 19, 1965, 35,602/65
Int. Cl. A01k 89/02
U.S. Cl. 242—84.52          8 Claims

ABSTRACT OF THE DISCLOSURE

A rotating spool fishing reel is provided with a friction brake acting between the casing and the spool only when the latter rotates in one direction and governed so that it acts either only at a lowermost range of speeds of such rotation or both at a lowermost and at a highermost range of speeds of such rotation. In one embodiment a pivotally mounted governor has a single brake shoe urged into engagement with a part of the friction brake either by the effect of centrifugal force on the mass of the governor itself and by a spring, at highest and lowest speeds respectively; in another embodiment a pivotally mounted governor has two brake shoes one urged into engagement with a part of the friction brake by a spring, at a lowermost range of speeds of rotation of the spool. It is desirable that the maximum frictional coupling between casing and spool shall be adjustable.

---

This invention relates to rotatable spool fishing reels, which are reels of the type in which the spool on which fishing line is wound rotates to unwind line from it during casting.

In such reels the spool should be braked both at the beginning and towards the end of a cast to prevent an overrun of the spool relative to the line being cast or excessive slackness in that line. The natural deceleration at the reel of a line while being cast can be considered as having three stages. At the beginning of a cast there is a need to smooth out delivery of the line, which is slowing down only slightly at that stage. In the middle stage of the cast there is little deceleration, but towards the end of the cast the line needs to stop. The part of the line remote from the spool may actually be accelerating at the time, as it falls downwardly, if the line has been allowed excessive freedom. It is desirable to start braking the spool as soon as the line starts losing its forward momentum.

If the spool does not have the desired deceleration characteristics there will tend to be a slight overrun of the spool at the beginning stage of the cast, and a considerable overrun at the end stage, resulting in a tangling of the line on the spool, or excessive slackness in the line cast from it; alternatively if the spool is excessively braked, loss of length in the cast results.

The most serious problem occurs with the deceleration which is needed at the very end of a cast and attempts have been made to solve it. The problem is a difficult one; the spool must be braked and yet must not be braked so hard that it shortens the cast. Originally, the rotatable spool was left to be braked by the finger or thumb of the angler. Obviously this required a good deal of skill if the cast was not to be unduly shortened. Various mechanical brakes have also been proposed to accomplish this but a usual mechanical brake has the characteristic of exerting a constant braking effect (constant deceleration), whatever speed the spool is moving at. Since the middle portion of a cast is one in which the spool should be allowed to revolve freely, braking the spool during that portion results in a shortening of a cast (if thick line is being used, owing to the rapid diameter change in the volume of line on the spool, there may actually be a tendency to acceleration of the spool during) that stage.

Also, a reel has been proposed having a brake operated by a sprung lever on which the line rests. When tension is present the brake is rendered inoperative by the pressure of the line on the lever. When the line goes slack the sprung lever rides out to a position that causes braking to the spool. The drawback with this type is that there must necessarily always be some braking effect on the spool as otherwise there would be no tension on the line to hold off the brake, and in practice these types of controls are restrictive of distance of cast.

An object of the present invention is to provide a rotatable spool fishing reel in which the spool is automatically braked with an increased braking effect as it slows down to a lowermost range of speeds when the spool rotates in one sense, corresponding to that in which line is paid out from the spool in casting. I achieve this by providing governor means which are affected by the speed of rotation of the spool and act in conjunction with a brake which works between the spool and the reel casing so that a variable braking effect is exerted which has the desired characteristics. The governor means may themselves include one or more brake shoe portions, and be pivotally mounted on the spool and affected by centrifugal force upon rotation of the spool, so that the braking portion of the governor member is moved towards or away from a braking surface associated with the reel casing.

To deal with the problem of the control needed at high speeds of revolution (at the first stage of a cast) air brakes have been proposed, which consist usually of a fan fast with the spool, and these air brakes have a correct characteristic of deceleration at the highermost and medium ranges of speed of revolution of the spool. But by their nature they are ineffective at lowermost speeds of revolution of the spool. A difficulty at this initial stage in the cast is encountered when a powerful caster uses the reel. If the control is too severe his power will be wasted.

Another object of the invention therefore is to provide a fishing reel which not only has automatically varied braking effect on the spool at a lowermost range of speeds, but also automatically varied light braking effect at a topmost range of speeds. The governor means which I provide may either have two brake shoes acting alternatively at highermost and lowermost ranges of speeds or have the independently movable parts, which counteract so that at highmost or lowermost speeds one or the other predominates while at medium ranges of speeds then either part is effective and little or no braking effect is exerted.

Other objects and features of the invention will appear from the following description of particular embodiments, which is given by way of example only. In the drawings:

FIGURE 1 is a side view of a first embodiment of reel,

FIGURE 2 is an end view of the first embodiment,

FIGURE 3 is a sectional view on the line III—III, FIGURE 2,

FIGURE 4 is a view on the arrow IV, FIGURE 1, with a part removed for clarity,

FIGURE 5 shows, in face and side views, a part of the embodiment,

FIGURE 6 shows parts of the embodiment, seen in the direction of the arrow VI, FIGURE 4, FIGURE 7 is a sectional view corresponding to that of FIGURE 3, but a second embodiment, FIGURE 8 is an end view corresponding to that of FIGURE 4, but of the second embodiment, FIGURE 9 is a view of part of the embodiment, seen in the direction of the arrow IX, FIGURE 8, FIGURE 10 is a sectional view of parts shown in FIGURE 7, on an enlarged scale, and FIGURE 11 is a view in the direction of the arrow XI, FIGURE 10.

The fishing reels shown have a stationary casing 1 with an end cover 2 and a line spool 3 rotatable about a central axis. The spool 3 is driven at one end from a handle 4 by a gearing arrangement 5 which is not relevant to the present invention and at the other end it has fan vanes 6 on an endplate 7.

In the first embodiment, shown in FIGURES 1 to 6, the spool revolves on spindles 8, 9 borne respectively in the end cover 2 and in a part fast with the casing. Ball bearings 10 entrapped in housings in the spool lessen the frictional resistance to rotation at these points. The spindle 8 has mounted on it an intermediate brake member in the form of a rotatable disc 11 with a cylindrical peripheral brake surface, positioned between a nut 12 surrounding the spindle and the end cover 2, with a spring washer 13 between the nut 12 and the disc 11 to urge the disc towards the end cover 2 and away from the spool 3. Between the disc 11 and the end cover 2 and frictionally engaging an annular planar braking face of the disc is a friction washer 14. Between the friction washer 14 and the end cover there is a part 15 (FIGURE 5) which has a central aperture 16 to allow mounting on the spindle 8, a pair of tongues 17 bent out of the general plane of the part to form stepped helical face-cam surfaces, and a pair of lugs 18 bent perpendicular to the general plane of the part. The tongues 17 can bear on balls 20 housed in a hub part 21 of the end cover 2 to project axially inwardly from it. The effect of this arrangement is that if the part 15 is rotated in one sense by the disc 11 through the friction washer the tongues 17 travelling over the balls 20 displace the friction washer away from the end cover 2 and towards the spool 3, thus increasing the frictional engagement of the disc 11 with the stationary end casing through the friction washer. If the disc is rotated in the opposite sense the balls travel to a part of the tongues 17 in the general plane of the part 15 so that the friction washer is only loosely held between the disc and the casing under the pressure of the spring washer 13 and there is little or no braking effect on the rotation of the disc. The amount of angular travel permitted to the tongues 17 and hence the maximum braking effect exertable on the disc 11 is governed by a control knob 22 outside the end cover which has diametrically opposed peripheral tongues projecting axially inwardly through arcuate slots 33 in the end cover 2 and acting as stops, engaging the lugs 18 and allowing only a predetermined range of movement to the lugs 18 in the arcuate slots.

The control knob 22 is resiliently urged towards the end cover 2 by a spring 23, and maintains the position to which it is set by frictional interaction between complementary annular surfaces 24 on its axially inward face and on the axially outer face of the hub part 21.

A friction braking engagement between the cylindrical peripheral surface of the disc 11 and the spool 3 is afforded by brake shoe portions 28, 32 of two arm governor members 27 pivotally mounted on the endplate 7 of the spool radially inwardly of the fan blades 6, so that the brake shoes are face to face with that cylindrical surface and can move to run on it. The brake shoe portions 32 are urged radially inwardly (when the spool is at rest) up to a position defined by a stop 31 by a portion 26 of a spring 25 acting on the blades 6 and engaging behind the flange which constitutes the brake shoe portion 32. The pressure exerted between the spool 3 and the disc 11 through the springs 25, is arranged so that an appropriate braking effect is exerted on the spool 3 when it rotates at a lowermost range of speeds in one sense of revolution, which will be the sense in which the spool rotates on casting. The braking effect increases through that range, as the spool slows down. This braking effect is derived through the shoes 32 and the disc 11 which, tending to rotate in this one sense, brings the tongues 17 against the balls 20 as has been described to frictionally engage the end cover. In the opposite sense of revolution, the disc frees itself from this braking pressure in the way which has been described.

At high speeds of revolution of the spool, however, centrifugal force acting on the free end portions of the springs 25, which are extended some distance away from the governor member 27, keeps the brake shoe portions 32 clear of the cylindrical braking surface of the disc 11 and the spool 3 is free to rotate in either direction.

As has been explained it is advantageous that also at extremely high speeds of rotation of the spool 3 there should be a braking effect, and in the present embodiment this is provided for. Each governor member 27 has a second brake shoe 28 and this is the other side of the pivot point from the spring 25. This arrangement acts as a positive governor (i.e. in the opposite way to the negative governor previously described) and since the center of mass of the spring 25 and governor member tends to fly outwards, overcoming the radial inward urging effect of the spring as has been described, at a highermost range of speeds of rotation of the spool the effect of the centrifugal force on mass of the governor is to press the brake shoe 28 against the cylindrical brake surface of the disc 11. This pressure is arranged to be very light and the springs 25 ensure that it is released as soon as the spool 3 rotates at any range of speeds lower than a highermost range.

The end cover 2 is secured to the casing 1 in a removable manner, by means of interlocking arcuate ribs and grooves 29a, 29b. In FIGURE 4 the end cover 2 and the parts secured to or mounted on it have been removed for clarity. A pin 30 may anchor the end cover against unwanted movement.

The second embodiment of reel shown in FIGURES 7 to 11 is generally very similar to that described previously, but the end cover 2 of the reel casing 1 has a modified hub part 21, and the governor means are modified.

The hub part extends axially inwardly as a sleeve 35, on the cylindrical outer surface of which is borne the disc 11', which is extended axially outwardly as a sleeve 36 of which the internal surface is circular but the external is square, when seen in end view. At the extreme end portion 37 of the sleeve 36 the external surface is however cylindrical, and upon this external surface there is borne the part 15 rotatable relative to the disc 11. A spring washer 38 and a friction washer 39 (which washer could be composite) have square central apertures so that they are keyed to the sleeve 36, on which they are axially slidable, to rotate with the disc 11'. The assembly of disc 11' part 15, friction washer 39 and spring washer 38 is held in place by a circlip 40 gripping on a part 41 of the sleeve 35. The spindle 8 penetrates the sleeve 35 and is screwed into a screwthreaded recess in the hub part 21 by a boss 42 with which it is fast.

The control knob 22' is urged towards the end cover 2 by a helical spring 43 trapped between a flange of the boss 42 and the knob 22'.

To alter the amount of movement available to the part 15 the control knob 22' is pulled outwardly to release a row of teeth arranged in a circle on its face from a corresponding row on the end casing and it may then be turned to control the amount of movement allowed for the part 15 and hence, as explained earlier, the braking effect on the disc 11' when rotating in one direction. The object of the construction just described is to avoid any possibility of slip of the friction washer 39 relative to the disc 11' which could result in an inefficient start to any braking action being exerted between the spool and the part of the reel against which the brake means acts, through the disc and friction washer.

The modification to the governor means is more clearly seen in FIGURES 8 and 9.

Composite governor members, generally designated 43, are pivotally mounted on an end plate 7 of the spool. Only one such governor is shown in FIGURE 8, but another identical, is symmetrically arranged on the same end plate. An annualr cover plate 52 protects the governor members. The governor member shown moves on a pivot 44 and is made up of two parts, a part 45 which is a pressing in sheet metal, and part 46 which is of spring strip. The part 45 has a planar portion 47 at one side of the pivot 44, and at the other side a leg 48, coplanar with the portion 47, and terminating in a perpendicularly directed flange 49 which can act as a brake shoe on the cylindrical braking surface of the disc 11. The flange 49 also serves to entrap one leg of the spring 46. This spring has an end portion 51 in the form of a hairpin, joined by a leg which passes behind the flange 49 and round the pivot 44 to a bearing portion 50 which abuts against the vanes 6 of the spool end plate in the manner of the spring portion 26.

The two parts 45, 46 are free to move pivotally independently of each other except insofar as they interact through the flange 49.

The center of mass of the free leg of the U-spring 46 is to be found in the hairpin which is formed in that way to increase the mass of the spring at the end portion 51.

At a highermost range of speeds of rotation the end portion 51 of the spring 46 will fly outward and so will the planar portion 47 of the first part 45 of the governor, the two parts being pivoted in opposite senses. This action of the planar portion 47 brings the flange 49 into contact with the disc 11' exerting a braking effect if the spool is rotating in one direction. The radially outward movement of the end portion 51 of the spring 46 frees the flange 49 from any pressure by that spring. The mass of the planar portion 47 being small, the braking effect exertable at this highermost range of speeds is less than that exerted (as will be described) at a lowermost range of speeds by virtue of the action of the spring 46.

At medium speeds of rotation of the spool the centrifugal force acting on the planar portion 47 of the first part 45 is much less, and at this stage the end portion 51 of the spring 46 is still outward of the flange, the net result being that at these medium speeds little or no braking effect is exerted by the flange 49 on the disc 11'.

At a lowermost range of speeds of rotation however, although the braking pressure due to centrifugal action of the planar portion 47 is almost nil, the spring 46 adopts almost its rest position, in which it urges the flange 49 against the disc 11'.

This modified construction has the desirable characteristics set out, together with smoothness of action in the governor means superior to that of the first embodiment described.

The embodiments which have been described have the advantage that there is, during casting, a slight braking effect at a highermost range of speeds of the spool, little or none at medium high speeds, and a braking effect, of which the size can be adjusted (according to the skill of the fisherman, weather conditions, weight of line etc.), at low speeds of the spool, to prevent the undesirable effects which have been discussed.

The vanes 6 act to give only a slight drag on the spool 3 when rotating, since the only air entering the end cover 2 does so through the slots 33 or tolerances between the spool end plate and the end cover, but this slight air movement helps dissipate any heat caused by the various frictional interactions.

Modified embodiments of the invention may have more or less than the two governor members shown by the described embodiments—care is to be taken to balance the spool for even rotation.

It is apparent that the omission of the brake shoe portion 28 from the first embodiment gives an embodiment in which a braking effect is exerted only at a lowermost range of speeds of rotation of the reel.

What I claim and desire to secure by Letters Patent is:
1. A fishing reel comprising:
 (a) a casing;
 (b) a spool having end plates, the spool being rotatable relative to the casing;
 (c) a centrifugally governed friction brake acting between the casing and the spool comprising:
  (1) a rotatable first friction member;
  (2) a second friction member;
  (3) a slippable frictional coupling between the first friction member and the second friction member;
  (4) a brake shoe mounted on an end plate of the spool to rotate with the spool and movable relative to the spool to run against and frictionally engage the first friction member;
  (5) centrifugally movable governor means for varying pressure of engagement between the brake shoe and the first frictional member;
  (6) means for mounting the second friction member for limited rotation relative to the casing about an axis coaxial with the axis of rotation of the first friction member; and
  (7) cam means acting to displace the second friction member axially towards the first to increase the degree of frictional coupling between them upon rotation of the second member under the influence of the first in one sense but to decrease the degree of coupling upon rotation of the second member in the opposite sense;
 (d) means for mounting the governor means on the end plate of the spool so that it will be sensitive to the absolute speed of rotation of the spool; and
 (e) means for operatively linking the governor means to the brake shoe in such a way that the engagement pressure of the brake shoe on the first member is greater at a lowermost range of speeds of the spool than at a next higher range of speeds of the spool, whereby automatic increasing braking is applied between the spool and the casing as the spool slows down in the said lowermost range of speeds, when rotating in one sense only, but the spool is substantially free of such braking when rotating in the other sense.

2. A fishing reel according to claim 1 wherein the governor means for varying the pressure of engagement between the brake shoe and the first frictional member includes a spring which is mounted on the spool end plate, the spring normally resiliently biasing the brake shoe toward increased pressure engagement with the first frictional member and the pressure of the spring on the shoe being lessened at increased speed of rotation of the spool by the effect of centrifugal force on the spring.

3. A fishing reel according to claim 2 wherein the governor means includes a governor member pivotally mounted on the end plate of the spool to pivot about shoe being integral with the governor member and the an axis parallel to that of rotation of the spool, the brake shoe being integral with the governor member and the spring being generally in the shape of a U, one leg of the U-shaped spring being free to move radially of the spool under the influence of centrifugal force on its mass to permit alteration of the pivotal attitude of the governor member and hence the engagement pressure of the brake shoe on the first friction member.

4. A fishing reel according to claim 2 comprising:
 (a) a second brake shoe;
 (b) means for operatively linking to said second brake shoe the governor means in such a way that the engagement pressure of the second brake shoe on the first friction member is greater at a highermost range of speeds of the spool than at a next higher range of speed of the spool; and
 (c) a pivotally mounted rigid governor member is disposed generally tangentially of the axis of rotation of the spool and bearing both the first and second brake shoes integrally with it, one on each side of its pivot, the center of mass of the governor member being eccentric of the pivot at the side of the pivot at which the first brake shoe is situated and the spring normally acting on the governor member to tend to pivot it in a sense to release the second brake from pressure engagement and apply the first, pivoting of the governor under the effect of centrifugal force on its own mass tending to release the first brake shoe from pressure engagement and apply the second.

5. A fishing reel according to claim 4 wherein both brake shoes move radially towards the axis of rotation of the spool to increase the respective engagement pressure with the friction member.

6. A fishing reel according to claim 2 wherein the governor means are such that the engagement pressure of the brake shoe is greater also at a highermost range of speeds of rotation of the spool than at a next lower range of speeds, the governor means comprising two separately movable integers:
  (a) a pivotally mounted governor member disposed generally tangential of the axis of rotation of the spool and with its pivotal axis parallel to that of rotation of the spool, the brake shoe at one side of the pivotal axis of the governor member and the center of mass of the governor member being at the other side of its pivotal axis; and
  (b) the spring comprises a U-spring disposed generally tangential of the axis of rotation of the spool and having one leg of the U movable in one radial direction under the influence of centrifugal force and in the other radial direction under the influence of the resilience of the spring, the axis of pivoting of the governor being adjacent the base of the U, the spring acting under the influence of its resilience to move the brake shoe into increased said engagement pressure,
  whereby the brake shoe engagement pressure with the direct friction member derives from the spring at the said lowermost range of speeds of rotation of the spool and from the action of the center of mass of the governor member at the said highermost range of speeds of rotation.

7. A fishing reel according to claim 6 wherein the brake shoe is pivoted to move radially towards the axis of rotation of the spool to increase said engagement pressure.

8. A fishing reel according to claim 1 wherein an adjustable stop controls the amount of rotation available to the second friction member, whereby the maximum amount of frictional coupling between the two friction members, upon relative rotation in one sense, is adjustable.

References Cited
UNITED STATES PATENTS 1,456,283   5/1923   Schmid.
1,566,594  12/1925  Graham.
2,573,240  10/1951  Berlinger _____ 242—84.5 XR BILLY S. TAYLOR, Primary Examiner U.S. Cl. X.R.

188—184; 242—84.44